(No Model.) 2 Sheets—Sheet 1.

F. B. RAE.
TROLLEY SUPPORT.

No. 426,066. Patented Apr. 22, 1890.

WITNESSES
INVENTOR
Frank B. Rae
Attorneys (No Model.) 2 Sheets—Sheet 2.

F. B. RAE.
TROLLEY SUPPORT.

No. 426,066. Patented Apr. 22, 1890.

WITNESSES
D. W. Bradford.
H. S. McArthur

INVENTOR
Frank B. Rae
by Foster & Freeman
Attorneys

UNITED STATES PATENT OFFICE.

FRANK B. RAE, OF DETROIT, MICHIGAN.

TROLLEY-SUPPORT.

SPECIFICATION forming part of Letters Patent No. 426,066, dated April 22, 1890.

Application filed February 4, 1890. Serial No. 339,143. (No model.)

*To all whom it may concern:*

Be it known that I, FRANK B. RAE, a citizen of the United States, and a resident of the city of Detroit, in the county of Wayne and State of Michigan, have invented certain new and useful Improvements in Trolley-Supports, of which the following is a specification.

My invention has reference to the construction of trolleys for use on cars driven by electricity, in which the energy is conveyed to the motor on the vehicles from wires supported over the track by means of said trolleys.

It has for its object to improve the construction of such trolleys with a view to their simplification, while at the same time they are capable of being adjusted to accommodate themselves to the variations of the particular conditions under which they are used.

To these ends my present invention consists in a trolley constructed, arranged, and operating substantially as herein pointed out.

Figure 1:
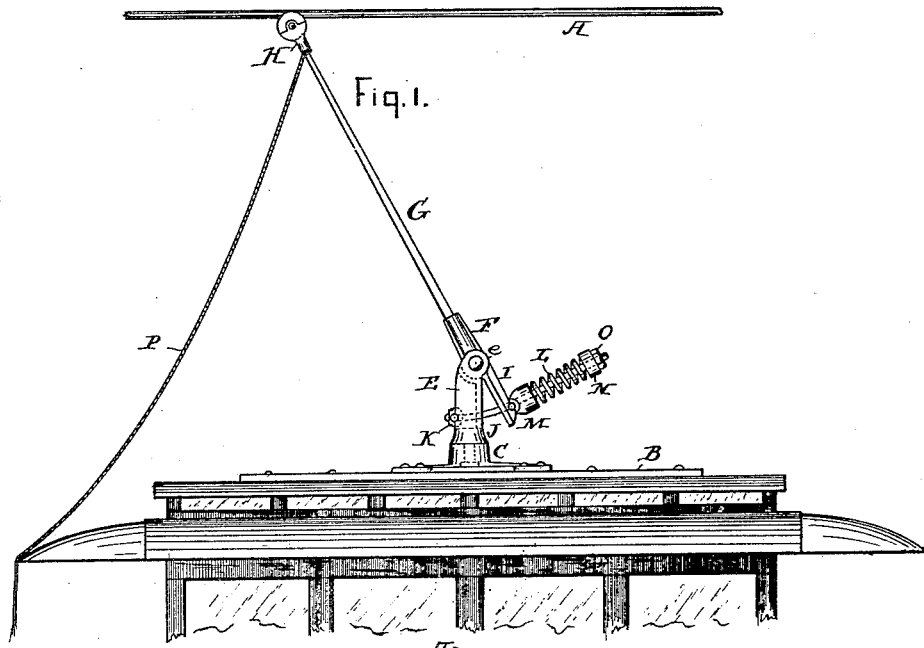
Figure 2:
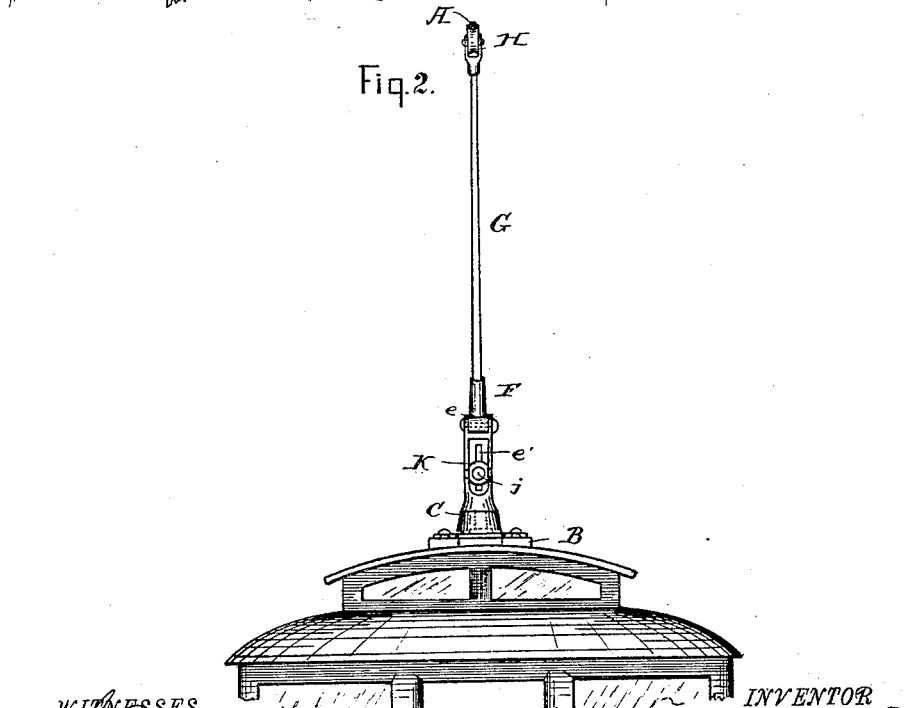
Figure 3:
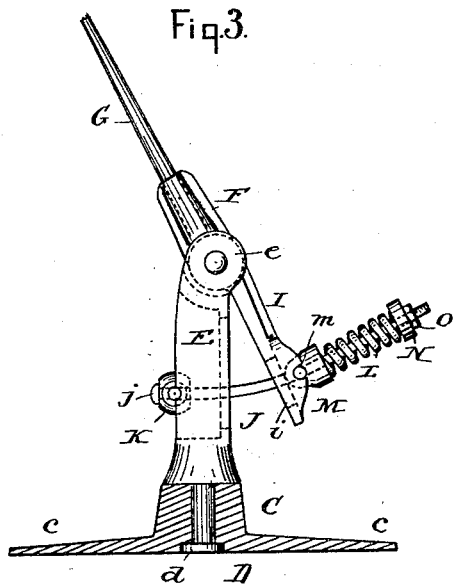
Figure 4:
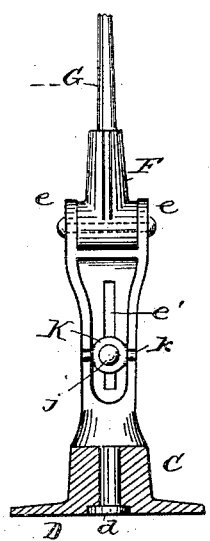
Figure 5:
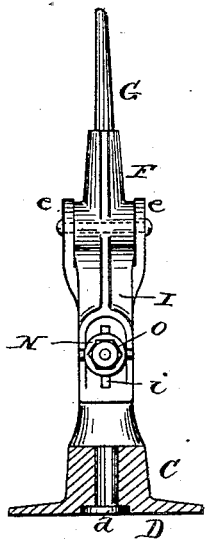

In the accompanying drawings, Figure 1 is a side view of a portion of a tram-car, showing the trolley in operative connection. Fig. 2 is an end view of the same. Fig. 3 is an enlarged side view of the means of supporting and regulating the adjustment of the trolley-arm; and Figs. 4 and 5 are respectively rear and front views of the same.

As is usual in such cases, the electric current is supplied through the conductor A, and on the car B is mounted the trolley-support carrying the trolley-arm and the adjustable appliances. In the present instance this trolley-support consists of a base-plate C, having flanges $c$, adapted to be secured to the roof of the car, or otherwise, and provided with a central socket, in which is fitted the stem D, having an enlarged head $d$, fitting an enlarged recess in the under side of the base-piece. Mounted on this stem and secured thereto in any suitable manner is the standard E, and as this standard bears upon the top of the base-plate it will be held in position thereon by the stem D, but at the same time permitted to rotate freely thereon.

The standard E may be variously constructed; but as shown it consists of a ribbed or flanged column having at its upper end the ears $e$, between which is pivoted the socket-piece F, adapted to receive the arm G, carrying the contact wheel or piece H, which is adapted to bear upward upon the under side of the conductor A. This pivotal socket-piece has an extension I projecting from one side of its lower portion, and as the standard is preferably curved slightly toward its top, so as to cause the ears $e$ to project slightly to one side, the extension I can normally bear against the flat side of the standard when the trolley-arm is held practically perpendicularly. When, however, the trolley is in operative position, it is usually inclined to a greater or less degree from the vertical to accommodate itself to irregularities of the conductor, and means are provided which cause it to bear upward with the requisite pressure against the conductor to prevent it from being strained and to get good electrical contact. In the present instance such means consist, essentially, of a rod or bar J, which is preferably curved through a portion of its length at least, and which projects through a slot $e'$ in the standard E, and is provided with an elastic cushion or washer K, bearing against the heavy-headed end of the rod J, and having trunnions or projections $k$, which bear against the sides or flanges of the standard E. The rod J projects through a slot $i$ in the extension I of the socket, and is provided with a spring L, (shown in the present instance as a coil-spring surrounding the rod,) which bears at one side against a sliding head or sleeve M on the rod, which is also provided with trunnions $m$, fitting in bearings on the outside of the extension I. The extremity of the rod L is provided with a washer N, bearing against the spring and an adjusting-nut O. A hand-cord P may be attached to the trolley-arm and extend to within the reach of the motor-man on the car, for the purpose of turning the trolley-arm and its standard to permit the car to go in the opposite direction.

It will be seen from this construction that I provide a simple, cheap, and effective arrangement of parts which will accomplish the desired result, and the proper and desired amount of normal pressure of the trolley against the conductor can be regulated by the adjusting-screws, while the spring will allow a proper amount of play to the trolley-arm, but will prevent its jumping or swinging in a manner liable to cause derailment. The rod can move freely in a vertical direction in the slot in the standard, and the slot in the extension of the socket-piece prevents any possible binding, while the trunnions at the bearing-points permit the rod to rock freely and at the same time bear evenly upon the parts. The pivoted standard, it will be understood, permits the trolley-arm to be rotated or to swing laterally to follow irregularities of the conductor.

Having thus described my invention, what I claim is—

1. The combination, with the pivoted standard having a flat side, of a socket-piece pivoted therein and having an extension projecting from one side of its lower portion and adapted to bear against the flat side of the standard, substantially as described.

2. The combination, with the pivoted standard, of the socket-piece pivotally mounted therein, an extension for said socket-piece, a rod connected to the standard and extension, and a spring upon the rod, substantially as described.

3. The combination, with the pivoted standard, of the socket-piece having an extension, a rod passed through a slot in the standard and extension, a sleeve upon the rod having trunnions bearing on the extension, and an adjustable spring bearing on the sleeve, substantially as described.

4. The combination, with the pivoted standard, of a socket-piece pivotally supported therein, an extension projecting from one side of the socket-piece, a rod curved through a portion of its extent, passing through a slot in the standard and having trunnions bearing on a side of the standard, a sleeve upon the rod having trunnions bearing upon the extension, a coil-spring surrounding the rod and bearing against the sleeve, and adjusting devices for regulating the tension of the spring, substantially as described.

5. The combination, with the base-piece having flanges, with a central socket having recessed lower ends, of a headed stem fitting said socket, a standard secured to said stem, the said standard carrying pivoted socket for the trolley-arm, and means for adjusting the pressure of said arm upon the conductor, substantially as described.

In testimony whereof I have signed my name to this specification in the presence of two subscribing witnesses.

FRANK B. RAE.

Witnesses:
D. W. BRADFORD,
W. M. THOMAS.